United States Patent [19]

Iacotti et al.

[11] 4,178,170
[45] Dec. 11, 1979

[54] PROCESS FOR THE PRODUCTION OF CARBURIZED SPONGE IRON BRIQUETTES

[75] Inventors: Italo Iacotti; Edoardo Pasero, both of Rome, Italy

[73] Assignee: Istituto di Ricerca Finsider per la Riduzione Diretta S.p.A., Rome, Italy

[21] Appl. No.: 914,906

[22] Filed: Jun. 7, 1978

Related U.S. Application Data

[63] Continuation of Ser. No. 818,834, Jul. 25, 1977, abandoned.

[30] Foreign Application Priority Data

Aug. 4, 1976 [IT] Italy .............................. 818834 A/76

[51] Int. Cl.$^2$ ................................................ C21C 5/52
[52] U.S. Cl. ............................................ 75/3; 75/11; 75/256; 264/111
[58] Field of Search ................... 75/3, 256, 34, 35, 11, 75/38; 264/111

[56] References Cited

U.S. PATENT DOCUMENTS

| | | | |
|---|---|---|---|
| 3,140,940 | 7/1964 | Keith ........................................ | 75/34 |
| 3,833,343 | 9/1974 | Holowaty et al. ................... | 75/44 S |
| 4,093,455 | 6/1978 | Pietsch ................................... | 75/256 |
| 4,116,678 | 9/1978 | Lafont et al. ............................ | 75/38 |
| 4,116,679 | 9/1978 | Pietsch ..................................... | 75/3 |

*Primary Examiner*—M. J. Andrews
*Attorney, Agent, or Firm*—Young & Thompson

[57] ABSTRACT

In the direct reduction of iron ore in a series of fluidized beds, for the production of carburized iron sponge briquettes for use in electric furnaces, carburization is carried out after the last fluidized bed, at a temperature of 600° to 700° C., by batching the reduced iron powder with a solid finely divided carbonaceous material and then briquetting the mixture, in an inert atmosphere.

3 Claims, No Drawings

PROCESS FOR THE PRODUCTION OF CARBURIZED SPONGE IRON BRIQUETTES

This is a continuation, of application Ser. No. 818,834, filed July 25, 1977 now abandoned.

The present invention relates to the production of sponge iron briquettes obtained for example by direct reduction in fluidized bed reactors. More precisely, the invention consists of a process for the manufacture of carburized (i.e. containing carbon either combined or not) sponge iron briquettes, characterized by the fact that the operation of carburizing is carried out during hot-forming of the spong iron briquettes.

In the fluidized bed direct reduction process, a reducing gas is used to fluidize and reduce the pulverized iron ore at one and the same time. The powdered product obtained from the last stage reactor is then transported, while still hot (i.e. at a temperature of approximately 650°–700° C.) and in an inert atmosphere (generally nitrogen), to the briquetting plant where it is compacted at high temperature into briquettes. The briquettes produced are cooled down to room temperature and then either fed directly to the electric furnace or stored.

Correct operation of the electric furnace requires (particularly when the pre-reduced materials are fed continuously to the furnace) that the briquettes should contain between 1% and 2% of carbon (depending on the residual oxygen content of the pre-reduced materials) either as fine particles scattered throughout the sponge or as carbon combined with the iron of the sponge. The function of the carbon content is primarily that of reacting in the liquid phase with the ferrous oxide still retained by the sponge to give carbon monoxide and iron according to the reaction $FeO + C \rightleftarrows Fe + CO$.

The reaction is strongly endothermic, is favored by the molten pool of the electric furnace and gives the following two advantages: (i) complete deoxidation of the iron; (ii) a stirring effect, caused by the escaping CO gas, which has beneficial effects on the heat exchanges of the iron sponge. Carburizing of the iron sponge has therefore the function of producing a material which incorporates the amount of solid reducing agent required for deoxidizing the iron completely.

According to the fluidized bed direct reduction technology currently used, the carburizing and reducing operations are as a rule performed simultaneously; in fact, the gas stream used for reducing the iron ore contains a certain percentage of components which are carburizing as well as reducing agents. There are, however, several disadvantages associated with the use of these carburizing agents which increase the overall cost of the reduction system. In the first place, the need to maintain constant the percentage of both carburizing and inert components throughout the reduction process renders unavoidable continuous bleeding of the reactors, the extent of this additional operation being mainly dependent on the percentage of carburizing components. In the second place, the carburizing components are liable to produce soot deposits which clog the more inaccessible parts of the equipment. Thirdly, the inclusion of carburizing components in the gas stream requires for a given production of iron sponge: (i) extra power for compressing and recycling the gas flow; (ii) increased reactor cross-section; (iii) extra heat input, since those components which participate in the reduction process to a certain extent only or not at all have also to be brought to operating temperature.

These disadvantages can be overcome by adopting the carburizing process of the present invention. The process is based on the principle of performing the carburizing operation downstream of the last reduction reactor. According to this invention, the iron sponge is carburized using solid carburizing agents.

The following operations are carried out on the iron powder at a temperature between 600° and 700° C. and in the presence of an inert atmosphere:
- batching with solid materials (added singly or in combination) having grain sizes not greater than 1 mm. and containing carbon with a low content of sulfur, ash and volatile materials;
- homogenizing of the mix;
- briquetting with standard techniques.

The solid material containing carbon may be selected from, for example, coke, graphite, anthracite, etc.

The process of this invention has the advantage of permitting accurate control of the amount of carbon input to the briquettes in view of their subsequent utilization in the electric furnace.

Following this general description of the process of this invention, examples are now given to illustrate the purpose, characteristics and advantages of the process, without however implying any limitation whatsoever to the scope of the invention.

EXAMPLE 1

One hundred twelve g. of powdered iron sponge (carbon content, 0.040%) was carburized by being mixed at 650° C. in a nitrogen atmosphere with 3 g. of coke having a grain size of less than 1 mm. and the following composition: ash, 9%; volatile materials, 0.5%; sulfur, 1%. The mix was then homogenized and hot-formed into briquettes. The briquettes obtained were found to have the following physical-chemical properties:

| Total carbon | 2.13% |
|---|---|
| Buckling load | 2310 kg/briquette |
| Average density | 4.44 g/cm$^3$ |

These briquettes are suitable for continuous feeding to an electric furnace.

EXAMPLE 2

An identical amount of iron sponge powder with the same initial carbon content was mixed under the same conditions described in Example 1 with 3 g. of electrode graphite having a grain size of less than 1 mm. The briquettes obtained were found to have the following properties:

| Total carbon | 2.50% |
|---|---|
| Buckling load | 2550 kg/briquette |
| Average density | 4.43 g/cm$^3$ |

These briquettes are suitable for continuous feeding to an electric furnace.

We claim:

1. A process for the production of carburized iron sponge briquettes for use in electric furnaces, comprising reducing powdered iron ore with the action of a reducing gas in a plurality of fluidized beds by passing the iron ore from bed to bed, removing the reduced powdered iron ore from the last bed, intimately admixing the reduced powdered iron ore from the last bed at a temperature between 600° and 700° C. with a solid material containing carbon and having a grain size not more than 1 mm. and a low content of ash, volatile materials and sulfur, in an inert atmosphere, and then briquetting the intimately admixed material.

2. A process as claimed in claim 1, in which said solid material is selected from the group consisting of coke, graphite, and anthracite.

3. A process as claimed in claim 1, in which said solid material containing carbon is present in an amount sufficient to impart to said briquettes a carbon content of about 1 to 2% by weight.

* * * * *